UNITED STATES PATENT OFFICE.

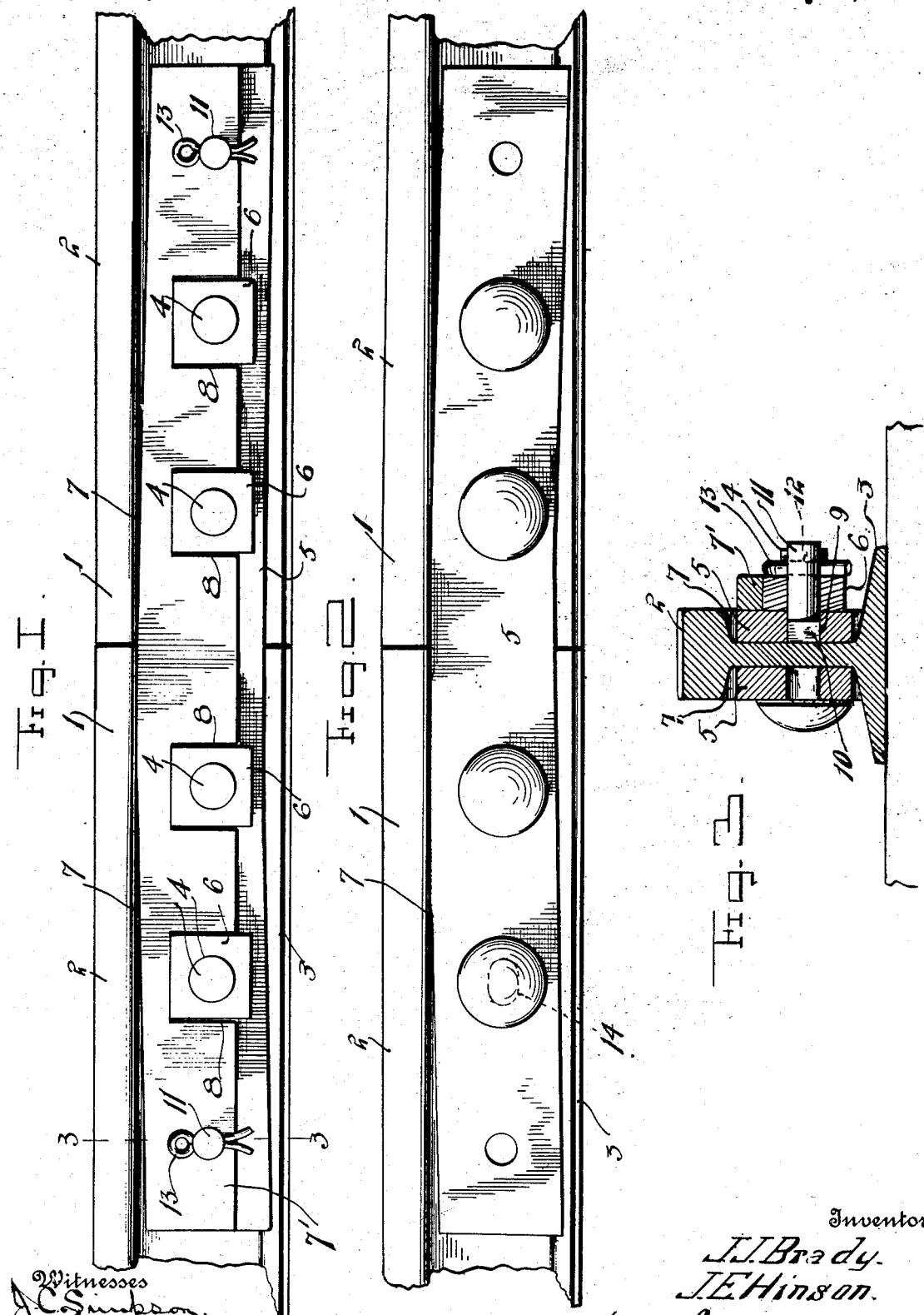

JAMES J. BRADY AND JOSEPH E. HINSON, OF CHESTER, GEORGIA.

FISH-PLATE FOR RAIL-JOINTS.

1,068,970. Specification of Letters Patent. Patented July 29, 1913.

Application filed February 17, 1912. Serial No. 678,165.

*To all whom it may concern:*

Be it known that we, JAMES J. BRADY and JOSEPH E. HINSON, citizens of the United States, residing at Chester, in the county of Dodge and State of Georgia, have invented certain new and useful Improvements in Fish-Plates for Rail-Joints, of which the following is a specification.

This invention relates to rail joints, and particularly to the construction of the fish plates used in connection therewith, said fish plates being so formed that the pounding upon the meeting ends of the rails, which tends to cause the same to sink is prevented.

A further object of the invention is to provide a new and novel form of nut-lock which may be easily and quickly attached to one of the fish plates.

With these and other objects in view, the invention consists in certain novel features of construction, combination and arrangement of parts as will be hereinafter fully described and claimed.

In the drawing: Figure 1 is a side elevation of a section of rails. Fig. 2 is a similar view taken from the opposite side. Fig. 3 is a sectional view on line 3—3 of Fig. 1.

Referring to the drawing, the numeral 1 designates the meeting ends of a pair of rails, the same being provided with the usual heads 2 and flanged bases 3. Adapted to be clamped in pairs and upon opposite sides of the rails 1 by bolts 4 are fish plates 5, said fish plates being firmly clamped upon manipulation of nuts 6, and in the usual manner. The upper edges of the fish plates 5 curve uniformly from their ends for a fraction of an inch, as indicated at 7, the highest portion contacting with the under surfaces of the heads 2 and at the meeting points of the rails. The lower edges of the fish plates 5 rest upon the base flanges of the rail, thus effectually supporting the meeting ends of the rails at a point where the pounding occurs upon passage of the wheels thereover. To prevent accidental rotation of the nuts 6, a plate 7' is provided, the same being provided at intervals with rectangular notches 8 for receiving the nuts 6 to prevent rotation of the same.

Formed in the opposite ends of one of the fish plates 5 are recesses 9, and in which seat the squared heads 10 of the pins 11, said pins being projected through openings formed in the plates 7'. The extreme outer ends of the pins 11 are provided with perforations 12, and in which are inserted cotter pins 13, thus retaining the plate 7' in its proper position, and effectually holding the nuts 6 against accidental rotation.

The bolts 4 are formed adjacent their headed ends with oval shaped enlargements 14 which fit in correspondingly shaped openings in one of the fish plates 5, thus holding the bolts each against rotation.

By the peculiar construction of the fish plates, the meeting ends of the rails are prevented from sagging, the pounding thereon being received directly upon the highest points of curvature.

What is claimed is:

The combination with the abutting end portions of a pair of rails, of a pair of upwardly arched arc-shaped fish plates, every transverse section of each plate presenting an oblong, said plates being disposed one against the webs at each side of the rails and overlapping both of them, said plates touching with their end portions only, against the base flanges of the rails, and touching against the undersides of the balls of the rails with their uppermost intermediate portions, and means for holding the plates to the rails, whereby springing of the rails and correlative longitudinal movement thereof may occur.

In testimony whereof we affix our signatures, in presence of two witnesses.

JAMES J. $\times$ BRADY.
his / mark

JOSEPH E. HINSON.

Witnesses:
G. G. McDANIEL,
J. R. HINSON.